No. 830,173. PATENTED SEPT. 4, 1906.
J. RIGGSBEE.
STEAM COOKER.
APPLICATION FILED NOV. 29, 1905.
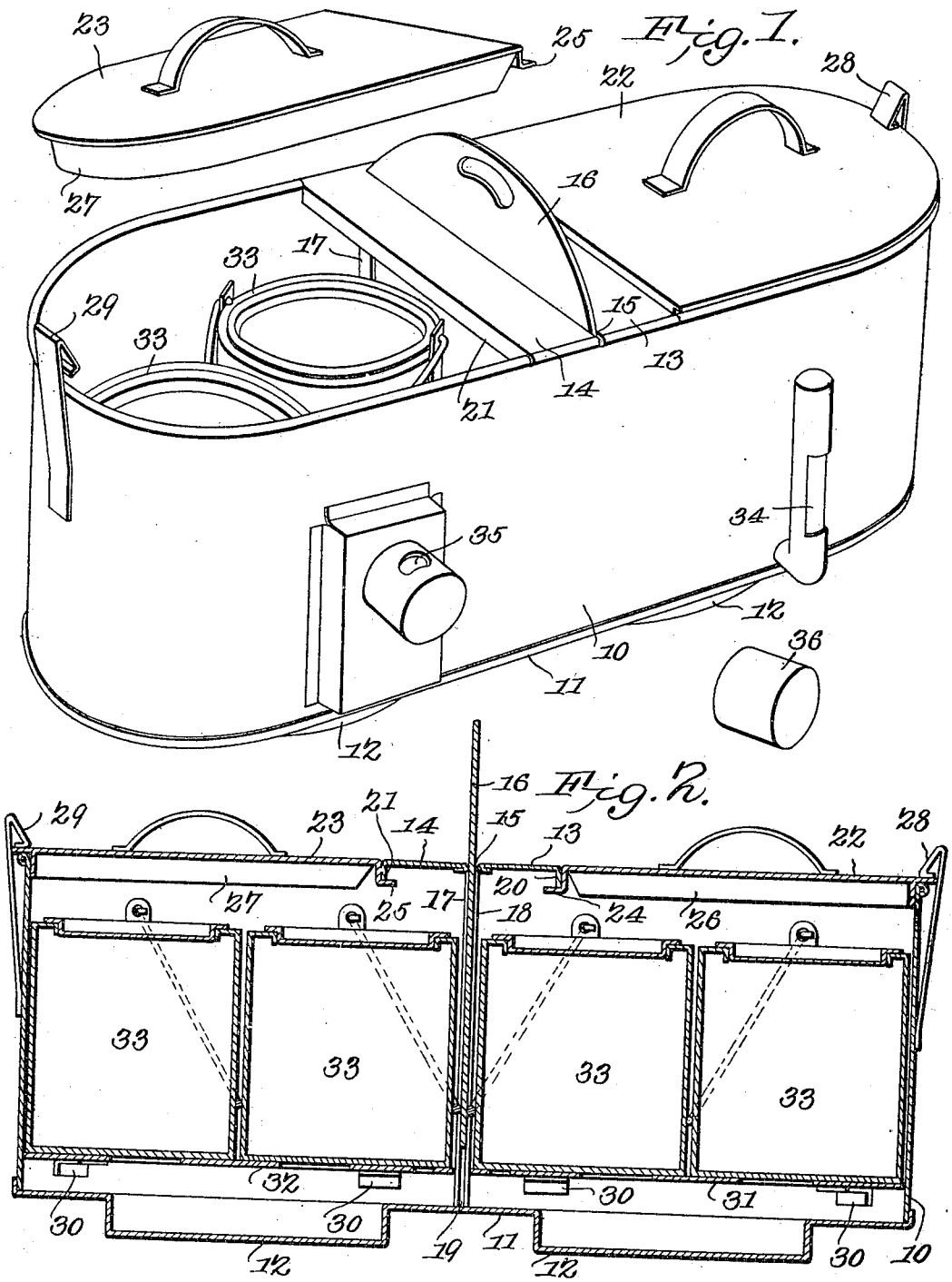
WITNESSES:
Jordan Riggsbee, INVENTOR
By ATTORNEYS

UNITED STATES PATENT OFFICE.

JORDAN RIGGSBEE, OF CHAPEL HILL, NORTH CAROLINA.

STEAM-COOKER.

No. 830,173.　　　Specification of Letters Patent.　　　Patented Sept. 4, 1906.

Application filed November 29, 1905. Serial No. 289,629.

*To all whom it may concern:*

Be it known that I, JORDAN RIGGSBEE, a citizen of the United States, residing at Chapel Hill, in the county of Orange and State of North Carolina, have invented a new and useful Steam-Cooker, of which the following is a specification.

This invention relates to steam-cookers, and has for an object to provide a cooker embodying new and improved features of convenience, economy, durability, and efficiency.

A further object of the invention is to provide a steam-cooker divided into independent compartments by a slidable division-plate which adapts the compartments for use independently or to be thrown together into a single compartment, as the exigencies of the cooking make desirable.

A further object of the invention is to provide a cooker having one or more closed cans or receptacles therein and in which food may be cooked without danger of contamination by other foods cooked simultaneously.

With these and other objects in view the present invention consists in the combination and arrangement of parts, as will be hereinafter fully described, shown in the accompanying drawings, and particularly pointed out in the appended claims, it being understood that changes in the form, proportion, size, and minor details may be made without departing from the spirit or sacrificing any of the advantages of this invention.

In the drawings, Figure 1 is a perspective view of the cooker with one cover and the closure for the filling-tube removed. Fig. 2 is a longitudinal vertical sectional view of the improved cooker.

Like characters of reference indicate corresponding parts in both figures of the drawings.

In its preferred embodiment the improved cooker forming the subject-matter of this application comprises a casing or boiler 10, having a bottom 11, provided with pits 12, spaced to engage within the lid-holes of an ordinary cooking-stove or range. Transversely across the casing intermediate its ends are secured the strips 13 and 14, providing a spacer 15, through which is inserted the vertically-sliding division-plate 16. Beneath the strips 13 and 14 are secured the vertical guides 17 and 18, defining a groove 19, registering with the slot 15 and in which the division-plate moves.

The opposite edges of the strips 13 and 14 are turned down to form the flanges 20 and 21, and closures 22 and 23 are proportioned to cover the open top of the casing and have, respectively, lips 24 and 25 proportioned to engage beneath the flanges 20 and 21. The covers have also flanges 26 and 27 proportioned to fit the curvature of the casing and resilient catches 28 and 29 to secure the covers removably to seat.

The casing is provided with any approved number of brackets at 30, which support perforate false bottoms 31 and 32, spaced from the bottom 11 and upon which is placed the food to be cooked, or any approved number of hermetically-closed receptacles 33.

The casing will be provided with a water-gage glass 34 and a filling-tube 35, which will be closed by the closure or cap 36.

It will be understood that in operation food may be placed upon the false bottoms 31 and 32, and by closing the slide 16 the food in the several compartments may be cooked without either becoming contaminated or floored by the other. For cooking larger numbers of different foods the hermetically-closed receptacles will be used, the number used depending on the different varieties of foods.

For cooking large articles—such, for instance, as a fowl or a ham—the division-plate may be removed, thereby throwing the cooker into one large covered boiler.

Having thus described the invention, what is claimed is—

1. A cooker comprising a receptacle having an open top, a horizontal partition across the top of the receptacle between its ends and provided with a slot, a vertical partition working through the slot and normally supported upon the bottom of the receptacle, perforate false bottoms removably supported in the receptacle at opposite sides of the vertical partition and above the bottom of the receptacle, removable covers supported upon the top of the receptacle and provided with depending flanges underlying the horizontal partition, and spring-catches for holding the covers upon the receptacle.

2. A cooker comprising a receptacle, a plate rigidly secured to the top of the receptacle at a point intermediate its ends to form a part of the cover, removable members adapted to be arranged on opposite sides of the plate to cover the receptacle, and a partition movable vertically with respect to said plate and normally disposed with its upper end projecting above the plate and exterior to the receptacle.

3. A cooker comprising a receptacle having an open top, a horizontal partition across the top between the ends of the receptacle and provided with a slot, guideways leading downwardly from opposite ends of the slot to the bottom of the receptacle, a vertical partition extending through the slot and the guideways and supported upon the bottom of the receptacle to divide the latter into compartments, false bottoms removably supported within the compartments above the bottom of the receptacle, opposite edges of the horizontal partition having depending flanges, removable covers supported upon the top of the receptacle and provided at their inner ends with substantially L-shaped flanges underlying the respective flanges of the horizontal partition, and spring-catches carried by opposite ends of the receptacle and engaging the covers to hold the same upon the receptacle.

In testimony that I claim the foregoing as my own I have hereto affixed my signature in the presence of two witnesses.

JORDAN RIGGSBEE.

Witnesses:
  J. M. CHEEK,
  W. H. TEMPLE.